Figure 1:
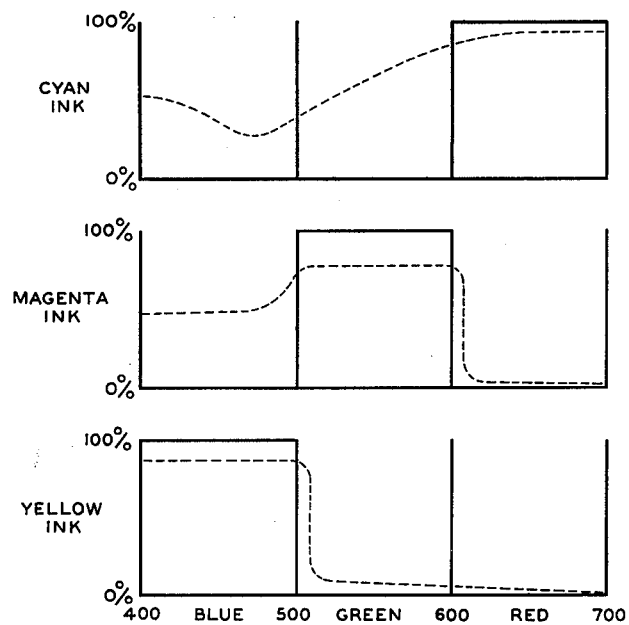

Feb. 8, 1966 M. A. DE RAMAIX ET AL 3,234,023
COLORED PHOTOGRAPHIC MASKS
Filed Jan. 14, 1960 5 Sheets-Sheet 4

FIG.4.

SCHEMATIC METHOD OF USING MASKING FILM WITH TRANSPARENT ORIGINAL TO OBTAIN PHOTOMECHANICAL REPRODUCTION

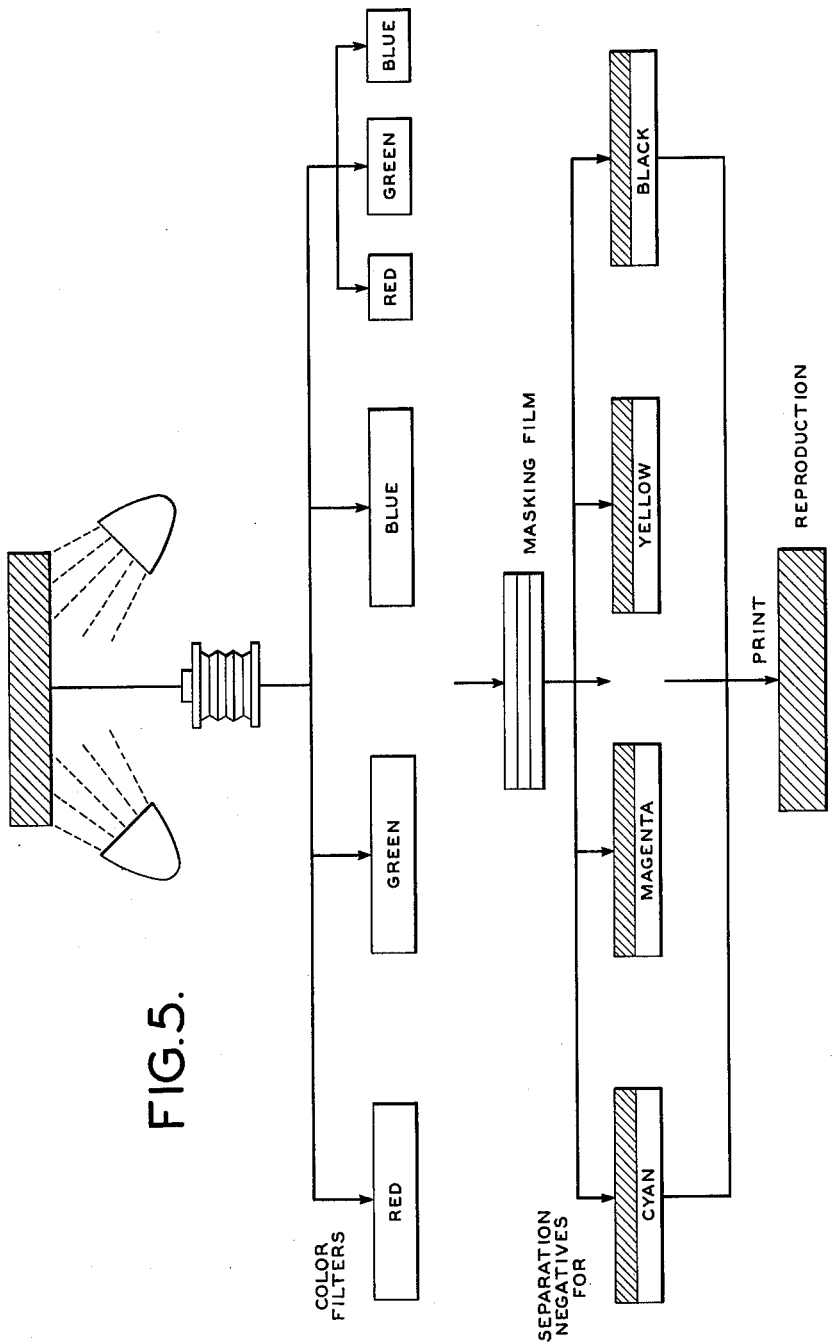

United States Patent Office 3,234,023
Patented Feb. 8, 1966

3,234,023
COLORED PHOTOGRAPHIC MASKS
Maurice Antoine de Ramaix, Hove-Antwerp, and Valere Frans Danckaert, Mortsel-Antwerp, Belgium, assignors to Gevaert Photo-Producten N.V., Mortsel, Belgium, a Belgian company
Filed Jan. 14, 1960, Ser. No. 2,362
Claims priority, application France, Jan. 14, 1959, 783,962, Patent 1,234,144
8 Claims. (Cl. 96—74)

The present invention relates to photographic and photomechanical reproduction processes, particularly color printing, and to the production of color correcting masks for multi-color reproduction processes.

It is known that on reproducing photographic multi-color images considerable undesirable color changes arise which are caused by the spectral and absorption deficiencies of the dyestuffs that are used in the reproducing process, such as the image dyestuffs of the multi-layer film, printing inks, etc. The kind and the degree of these undesirable color changes vary according to the color involved. That is, reproduction of inaccuracies of color saturation, lightness and color hue displacements, either alone or in combination with each other can vary according to the particular dyestuff. The deficiencies of the dyestuffs are due to optical deviations from the so-called ideal behavior because the dyestuffs used in the reproduction process absorb light in that two-thirds of the visible spectrum, in which light should be transmitted completely.

Heretofore it has been impossible to manufacture dyestuffs that have the absorption and transmission characteristics of an "ideal" dyestuff. The main cause of the undesirable color changes is due to the commercial magenta dyestuffs which deviate most from the characteristics of an "ideal" dyestuff. Ideally, the magenta dyestuff should completely absorb the light in the green part of the spectrum and completely transmit the light in the blue and red parts of the spectrum. However, it has been found that instead of completely transmitting the light in the blue and red part of the spectrum, commercial magenta dyestuffs absorb much of this light and have a particularly high absorption, or as it is most usually called, side-density, in the blue part of the spectrum. The side-density in the red part of the spectrum is less than that in the blue part of the spectrum but is still appreciable.

An "ideal" cyan dyestuff should completely transmit the light in the blue and green parts of the spectrum and absorb only red light. However, it has been found that commercial cyan dyestuffs exhibit an unwanted absorption of light in the blue and green parts of the spectrum.

The yellow dyestuffs that are commercially available most closely exhibit the characteristics of an "ideal" yellow dyestuff which should completely transmit the light in the red and green parts of the spectrum and completely absorb the light in the blue part of the spectrum. However, even commercially yellow dyestuffs exhibit a slight undesirable absorption or side-density in the green and red parts of the spectrum.

The difference in the absorption characteristics of "ideal" and commercially available dyestuffs are indicated in FIGURE I in which the absorption characteristics of "ideal" cyan, magenta and yellow dyestuffs are indicated by solid black lines and the same characteristics of commercially available cyan, magenta and yellow dyestuffs by dotted lines. The abscissa of FIGURE I shows the wave length of the light rays that are absorbed by the dyestuffs. The ordinate of the graph shows percent absorption from 0%, which would represent complete transmission, to 100% which would represent complete absorption.

It will be noted from FIGURE I that an "ideal" dyestuff should completely absorb the light rays of one-third of the white light spectrum whereas it should completely transmit the light of the other two-thirds of the spectrum. It is obvious from FIGURE I that the commercially available dyestuffs do not possess the absorption characteristics of "ideal" dyestuffs.

For example, in the preparation of lithographic plates by a color separation process, these absorptions occur in a color selection of a multi-color image made with light from each one-third of the spectrum in such a way that this color selection contains in determined gradations the color selections belonging to the two other thirds of the spectrum as undesirable images. Thus the green- and red-filter selection is to a considerable part contained in the blue filter (yellow) selection and each color selection fundamentally is falsified by the two other color selections.

Since it has been impossible to manufacture "ideal" dyestuffs, heretofore color corrections, for example, of lithographic selections, have been made by means of masks which are intended to remove the undesirable part images from the selection to be corrected. In some methods, masks are used which are light-sensitive for two-thirds of the spectrum and which are colored in the same color for which they are each time sensitive, such as described in U.S. Patent 2,376,132.

It is also known to use at least two or three masks, applied to one common support and to use a contrast reducing mask that can be present in the cyan layer. For this purpose the respective cyan mask part layer can also receive a certain but low spectral sensitivity in the red part of the spectrum as described in British specification 811,311.

However, heretofore all the known masks such as those described above have the disadvantage that the correction of the blue light side-absorption of the magenta (which side absorption is actually the most disturbing) is insufficient, and that the correction of the blue light side-absorption of the cyan is too strongly exaggerated.

Objects of invention

Therefore it is an object of this invention to provide novel photographic masks for use in color reproduction processes.

It is a further object of this invention to provide novel photographic masks that correct for color errors due to the dyestuffs used in the photographic masks.

It is a still further object of this invention to provide novel photographic masks composed of cyan, magenta and yellow colored masks that have different selective light absorption characteristics.

Color correction by controlling range of spectral sensitivity of color layers We have found that when using a colored mask with a determined gradation for the correction of one side-absorption of a dyestuff, the correction obtained with a mask which is sensitive for more than one-third of the spectrum is less than the correction obtained with a colored mask of the same gradation which is sensitive for only one-third of the spectrum. For example, the correction of the blue light side-absorption of the magenta dyestuff obtained with a yellow colored mask with a gamma value of 0.5 which is green- and red-sensitive (e.g. sensitive to two-thirds of the spectrum) is smaller than that obtained with a mask with a gamma value of 0.5 which exclusively is green-sensitive, and the correction with a yellow colored mask with a gamma of 0.5 which is blue-, green- and red-sensitive, is still less effective. Although the scientific reason for the decrease in the corrective influence of the mask with increases in spectral sensitivity is not known, it has been found to apply generally to yellow, cyan and magenta colored masks.

Therefore it may be seen that if a mask is used having two layers, one a blue- and red-sensitive magenta layer and the other a green- and red-sensitive yellow layer such as described in British specification 811,311, the biggest imperfection, viz. the blue-light side-absorption of the magenta, is not sufficiently eliminated since the sensitivity of the yellow layer is spread over two-thirds of the spectrum. That is, the yellow layer is less effective to correct for the blue-light side-absorption of the magenta layer than it would be if it were sensitive to only one-third of the spectrum.

*Color correction by using side-absorption of dyestuffs in the masking layers*

We have further found that when composing colored masks, the side-absorptions of the dyestuffs present or formed in the mask should be taken into account since the dyestuffs also show side-absorptions which, in particular as regards the magenta dyestuff, are so considerable that the side-absorptions themselves can be considered as mask images. Therefore if these side-absorptions are not considered when composing the masking material some side-absorptions of the dyestuffs in the material to be reproduced will in some cases be corrected more than once, so that over-correction occurs. Thus it may be seen that by the use of a mask-material containing a blue- and red-sensitive magenta layer, as a result of the side-absorption of the magenta dyestuff in the blue (false yellow), a correction is obtained not only for the side-absorption of the cyan and yellow dyestuffs in the green region of the spectrum, but also an appreciable correction for the side-absorption of the cyan dyestuff in the blue region of the spectrum is obtained. By the use of a blue- and red-sensitive magenta layer together with a green- and red-sensitive yellow layer such as described in British specification 811,311, the same imperfection, viz. the blue light side-absorption of the cyan is eliminated a second time and as a result a further correction occurs. This over correction is particularly undesirable since blue light-absorption of the cyan is rather slight in comparison with the green light side-absorption of the cyan.

Figure 2:
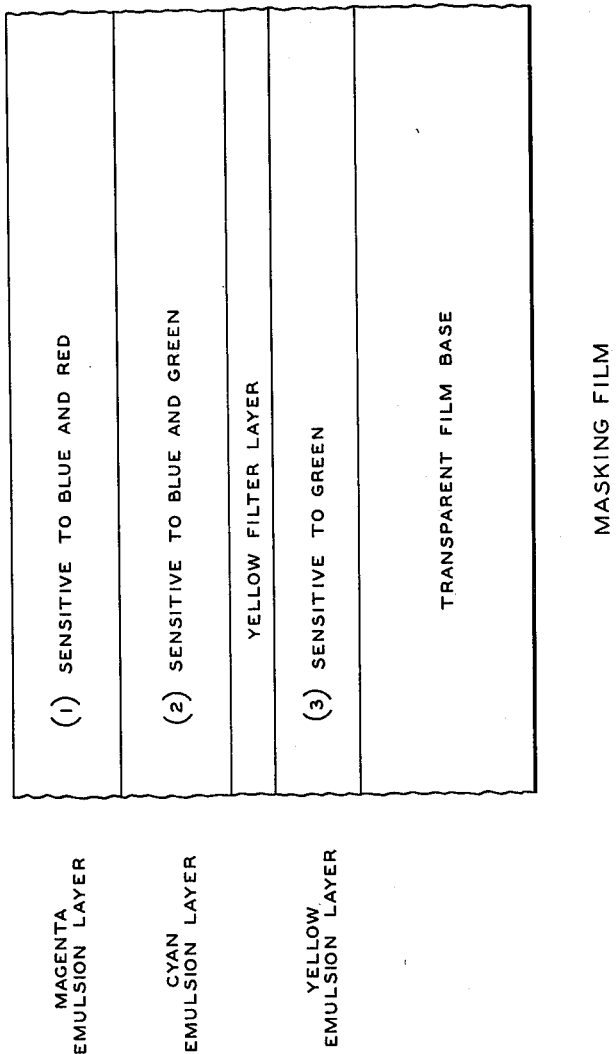

Starting from the above-mentioned findings we have discovered that in the reproduction of multi-color images by simultaneously using yellow, cyan and magenta colored correcting masks, a considerably improved color reproduction is obtained if the mask is composed of (1) a cyan mask formed from a blue- and green-sensitive layer, (2) a magenta mask formed from a blue- and green-sensitive layer, and (3) a yellow mask that is exclusively green-sensitive. A mask having this composition is shown schematically in FIGURE 2.

Further, we have found that in many cases, the correction obtained with a cyan colored mask which is only sensitive to two-thirds of the visible spectrum, viz. to blue and green, is rather too excessive. It was found, however, that this evil can be remedied by forming the cyan mask from a layer sensitive to the whole spectrum.

Figure 3:
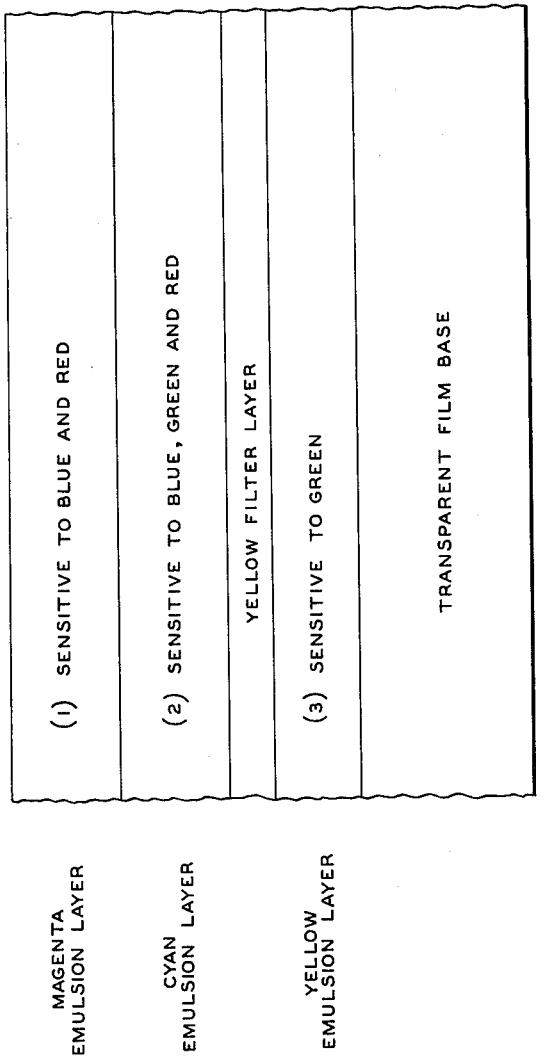

Therefore our preferred combined color correcting masks are those in which the yellow mask that has to give the greatest correction is only sensitive to one-third of the spectrum, the magenta mask that has to give the moderate corrections is sensitive to two-thirds of the spectrum and the cyan mask that has to give the least corrections is sensitive to the complete spectrum. The preferred masks of our invention are illustrated in FIGURE 3.

For carrying out the masking method according to the present invention, three color correcting masks can be used which each are formed upon a separate material and afterwards are registered with each other in order to form a combined mask; preferably, however, one material is used which contains the three mask layers. Such a combined masking material can be manufactured by starting from a subtractive color photographic multilayer material consisting of a transparent support coated with a green-sensitive silver halide emulsion layer containing a color coupler for yellow, a blue- and red-sensitive silver halide emulsion layer containing a color coupler for magenta, and a blue-, green- and, as a preferred embodiment red-sensitive silver halide emulsion layer containing a color coupler for cyan.

Conferring the suitable color sensitivity to the different layers of the masking material can be done by known methods of adding one or more optical sensitizers. In order to exclude completely the inherent sensitivity of the silver halide layer containing the color coupler for yellow to blue-light a yellow filter layer, such as colloidal silver is interposed between the yellow layer and the other two layers. Ordinarily in using the masking film it is exposed so that the yellow layer is most distant from the light source to further reduce the influence of the blue part of the printing light.

Suitable color couplers that may be used for the manufacture of the masks according to the present invention are as follows.

For the magenta layer:

6-alpha-hexadecenylsuccinyl-amido-indazolone or
1-p-sulphophenyl-3-octadecyl-pyrazolone-5

For the cyan layer:

4-sulpho-1-hydroxy-2-naphthoic acid octadecylamide or
4-sulpho-1-oxy-2-naphthoic acid-2'-hexadecyl-oxy-5'-sulpho-anilide For the yellow layer:

p-Stearoylamino-benzoyl-aceto-3,5-dicarboxyanilide,
m-Palmitoylaminobenzoyl-aceto-3,5-dicarboxyanilide, or
p-Cetyloxybenzoyl-acetamino-(3)-benzenesulphonic acid-(1).

The treatment of an exposed original with a multicolor mask may be carried out according to the methods generally known in the photographic art.

In the masking of original transparencies, in general a negative of the light tones or of the dark tones that is produced upon very vigorously acting panchromatic material by contact printing without any color filter. This negative is registered with and mounted upon the original in the usual way.

This combination is used for contact printing the mask film according to the present invention and without using color filters in a way as to obtain a color and contrast correcting mask. This mask is developed in a color developer as generally used for the production of color negative records. After drying the three-color mask and discarding the light mask the three-color mask is brought into exact register with and mounted upon the original. When using selection filters, correct negative selections can be obtained from this combination. The black selection is produced either without color filters or with one or more color filters according to the kind of the original transparency.

The process according to the present invention cannot only be applied to multicolor printing but also may be used for all photographic and photomechanical reproduction processes, particularly for the production of prints, enlargements and the like upon light-sensitive color-papers, transferable light-sensitive photographic layers and the like. For instance, masks for a color negative can be produced on the multi-layer film, the masks then can be assembled on the color negative and afterwards prints or enlargements can be produced on color papers. Likewise prints or enlargements can be produced upon light-sensitive transferable gelatin layers or upon light-sensitive layers suitable for transfer of printing colors.

In the production of masks for color transparencies the multi-layer film according to the invention can also be used. In this case the masks can be mounted on the transparency and printed or enlarged onto color reversal paper.

It is evident that the films according to the present invention can be replaced by corresponding plates. The sensitivities of the different layers of the mask film can be adapted according to the kind of dyestuffs of the original or of the reproducing material.

Several methods for manufacturing and using a combined color correcting mask according to the present invention are described in the Gevaert brochure "Reprorama" Oct. 10, 1959.

The following examples are intended to illustrate the invention without limiting, however, the scope thereof.

EXAMPLE I

As usual in correcting color reproductions that are made by reproduction of color transparencies in which masks are used a negative of the light areas is first produced, that is, a negative which only reproduces the most transparent details of the original. For this purpose a very vigorously acting panchromatic material is used which is developed in a normal strongly diluted negative developer. The most blackened areas possess a density of only about 0.5.

The negative of the light areas is then brought into exact register with the original and fixed on the rear side thereof. A light-diffusing sheet is disposed on this assembly which causes a light unsharpness in the colored mask to be produced. By this slight unsharpness, the fine details and contours are not removed by the mask and consequently are maintained in the selection negatives.

The above-described combination of the original to be reproduced, the light diffusing sheet and the negative of the light parts then is exposed to a multilayer color masking film sheet that has the following constructions:

(1) A polystyrene support sheet provided with a subbing layer;

(2) An antihalation layer of a black silver suspension in gelatin that is provided with a thin gelatin layer;

(3) A green-sensitized low sensitive gelatin silver bromo iodide emulsion layer containing p-cetyloxybenzoyl-acetamino-(3)-benzenesulphonic acid-(1) as a yellow color coupler;

(4) A yellow filter layer made from colloidal silver;

(5) A blue-sensitive, green-sensitized low sensitive gelatin silver bromo-iodide emulsion layer containing 1-oxy-4-sulphonaphthoic acid-2'-cetyloxy-5'-sulphoanilide as cyan color coupler;

(6) A blue-sensitive, red sensitized low sensitive gelatin silver bromo-iodide emulsion layer containing 6-hexadecenylsuccinylamido-indazolone as magenta color coupler;

(7) A gelatin protective layer containing a minor amount of matting agent.

After exposure, the masking film is developed for 4 minutes at 20° C. in a color developing solution of the following composition:

Diethyl-p-phenylenediamine hydrochloride ____g__ 3
Hydroxylamine hydrochloride _____g__ 1.5
Sodium sulphite (anhydrous) _____g__ 4
Sodium carbonate (cryst.) _____g__ 50
Potassium bromide _____g__ 1
Distilled water to _____cm³__ 1000 and rinsed for 2½ minutes in running water of 18 to 22° C. The exposed film then is brought into a bleach fixing bath containing an iron complex of an ethylenediamine tetra acetic acid sodium salt in order to remove the metallic silver and the non-developed silver salts. For the preparation of the bleach fixing bath a powder mixture can be used such as "G 70," marketed by Gevaert Photo-Producten N.V.

The film is bleached for 10 minutes at 20° C. with continuous movement in the bleach fixing bath, rinsed for 10 minutes in running water at 18–22° C. and thereafter dried. In this way, a color negative is obtained containing the three color images formed by dyestuffs. The contrast of this negative amounts to about 45% of that of the original.

The negative of the light areas is separated from the original and replaced by the color mask. Now, the color selection negatives are produced in the usual way: the negative for the yellow printing plate with a blue filter, the negative for the magenta printing plate with a green filter and the negative for the cyan printing plate with a red filter. For obtaining a black- or gray printing plate, exposure may be effected through one or more filters according to the kind of the original.

The color selection negatives thus obtained show in the color in which they are to be printed a higher color saturation and a better color separation in the neighbouring and complementary colors than color selection negatives obtained without the use of our color correcting mask, such as by the use of normal selection filters. Furthermore, the use of our new mask-film simultaneously yields a gray-tone correction in all four color selection negatives. The mask-film can be used in the same way if in the reversal process a color proof is to be made from a color transparency onto reversal paper.

A method of using the color masks of this invention with transparent originals is shown schematically in FIGURE 4.

EXAMPLE 2

The preferred masks of our invention can be constructed in the same way as the masks described in Example 1, but by sensitizing the gelatin silver bromo iodide layer containing the color coupler for cyan to green and red by using an ortho-pan-sensitizer or a combination of an ortho- and pan-sensitizer.

EXAMPLE 3

The new mask-film of this invention described in Examples 1 and 2 can also be used for masking opaque originals in reproduction cameras. For this purpose a transparent mask holder is needed. According to this method a sheet of mask film is first brought onto a transparent mask holder and by means of vacuum it is held in the required flat position. The mask film then is exposed in the reproduction camera to the opaque original and thereafter treated exactly as described in Example 1. By means of the exposure light and with opened objective, the position of the mask can be registered with the mask holder in the light beams. For controlling the register accuracy, a strip of a light diffusing sheet is applied to the mask negative each time at the area to be controlled. When the mask is accurately registered, it is mounted on the mask holder in such a way that during the exposure in the dark room, the vacuum is not necessary any longer. Subsequently, the selection negatives can be produced in the usual way and used with the usual negative of the light areas.

A method of using the color masks of this invention with opaque originals is shown schematically in FIGURE 5.

EXAMPLE 4

The new mask-film as described in the foregoing Examples 1 and 2 can also be used for obtaining motion picture films of considerably improved quality. One proceeds in the same way as in Example 1 except that here the mask-film is used with the negative. The use of a registration printer is necessary to obtain the required accuracy. By the use of the new mask-film for this purpose, color positives are obtained which have a stronger coloration and also purer colors are reproduced.

EXAMPLE 5

The new mask-film as described in the foregoing Examples 1 and 2 can also be used for the reproduction of better color prints on paper. For this purpose a mask made from the original by contact printing is accurately registered with the original before making the color prints. This method results in the preparation of a color negative and a print thereof with considerably better color brilliancy than can be made by using conventional masking methods. By the same process, also a color transparency can evidently be obtained. In most cases, it is not necessary before producing the mask film to make a negative of the dark areas similar to the negative record of the light areas that is described in Examples 1 and 2. However a negative of the dark areas may be used if better tone separations in the shadow areas is desired.

We claim:

1. A light-sensitive color photographic material for masking purposes consisting essentially of on a transparent support, an antihalation layer, a silver halide emulsion layer optically sensitized to green light and containing a color coupler for yellow, a blue-sensitive silver halide emulsion layer optically sensitized to green light and containing a color coupler for cyan, a blue-sensitive silver halide emulsion layer optically sensitized to red light and containing a color coupler for magenta, and a filter layer for blue light, said filter layer being interposed between the silver halide emulsion layer containing the color coupler for yellow and the silver halide emulsion layers respectively containing the color coupler for cyan and the color coupler for magenta to prevent the passage of blue light to the layer containing the color coupler for yellow.

2. A light-sensitive color photographic material for masking purposes consisting essentially of on a transparent support, an antihalation layer, a silver halide emulsion layer optically sensitized to green light and containing a color coupler for yellow, a blue-sensitive silver halide emulsion layer optically sensitized to green light and to red light and containing a color coupler for cyan, a blue-sensitive silver halide emulsion layer optically sensitized to red light and containing a color coupler for magenta, and a filter layer for blue light, said filter layer being interposed between the silver halide emulsion layer containing the color coupler for yellow and the silver halide emulsion layers respectively containing the color coupler for cyan and the color coupler for magenta to prevent the passage of blue light to the layer containing the color coupler for yellow.

3. In a process for making a substractive multi-colored picture from a multi-colored record, the method of modifying the record while printing therefrom so that exposures made therethrough will be color corrected, which method includes the steps of placing in printing relation to the record a light-sensitive color photographic material as claimed in claim 1, exposing said color photographic material through the record to white light including the three primary colors, processing said color photographic material to a multi-colored mask for the record by processing the three silver halide emulsion layers in said exposed light-sensitive color photographic material, respectively to yellow, cyan and magenta, color images that are a negative to the record, and printing from the multi-colored record a color separation of each primary color while holding said multi-colored mask in optical register to the record.

4. In a process for making a subtractive multi-colored picture from a multi-colored record, the method of modifying the record while printing therefrom so that exposures made therethrough will be color corrected, which method includes the step of placing in printing relation to the record a light-sensitive color photographic material as claimed in claim 2, exposing said color photographic material through the record to white light including the three primary colors, processing said color photographic material to a multi-colored mask for the record by processing the three silver halide emulsion layers in said exposed light-sensitive color photographic material, respectively to yellow, cyan and magenta, color images that are a negative to the record, and printing from the multi-colored record a color separation of each primary color while holding said multi-colored mask in optical register to the record.

5. A light-sensitive color photographic material for masking purposes consisting essentially of on a transparent support, a silver halide emulsion layer optically sensitized to green light and containing a color coupler for yellow, a blue-sensitive silver halide emulsion layer optically sensitized to green light and containing a color coupler for cyan, a blue-sensitive silver halide emulsion layer optically sensitized to red light and containing a color coupler for magenta and a filter layer for blue light, said filter layer being interposed between the silver halide emulsion layer containing the color coupler for yellow and the silver halide emulsion layers respectively containing the color coupler for cyan and the color coupler for magenta to prevent the passage of blue light to the layer containing the color coupler for yellow.

6. A light-sensitive color photographic material for masking purposes consisting essentially of on a transparent support, a silver halide emulsion layer optically sensitized to green light and containing a color coupler for yellow, a blue-sensitive silver halide emulsion layer optically sensitized to green and red light and containing a color coupler for cyan, a blue-sensitive silver halide emulsion layer optically sensitized to red light and containing a color coupler for magenta and a filter layer for blue light, said filter layer being interposed between the silver halide emulsion layer containing the color coupler for yellow and the silver halide emulsion layers respectively containing the color coupler for cyan and the color coupler for magenta to prevent the passage of blue light to the layer containing the color coupler for yellow.

7. In a process for masking color originals in color reproduction processes the improvement which comprises using a masking material consisting essentially of on a transparent support, a silver halide emulsion layer optically sensitized to green light and containing a color coupler for yellow, a blue-sensitive silver halide emulsion layer optically sensitized to green light and containing a color coupler for cyan, a blue-sensitive silver halide emulsion layer optically sensitized to red light and containing a color coupler for magenta and a filter layer for blue light, said filter layer being interposed between the silver halide emulsion layer containing the color coupler for yellow and the silver halide emulsion layers respectively containing the color coupler for cyan and the color coupler for magenta to prevent the passage of blue light to the layer containing the color coupler for yellow.

8. In a process for masking color originals in color reproduction processes the improvement which comprises using a masking material consisting essentially of on a transparent support, a silver halide emulsion layer optically sensitized to green light and containing a color coupler for yellow, a blue-sensitive silver halide emulsion layer optically sensitized to green light and to red light and containing a color coupler for cyan, a blue-sensitive silver halide emulsion layer optically sensitized to red light and containing a color coupler for magenta and a filter layer for blue light, said filter layer being interposed between the silver halide emulsion layer containing the color coupler for yellow and the silver halide emulsion layers respectively containing the color coupler for cyan and the color coupler for magenta to prevent the passage of blue light to the layer containing the color coupler for yellow.

References Cited by the Examiner

UNITED STATES PATENTS

| | | | |
|---|---|---|---|
| 2,367,551 | 1/1945 | Yule | 96—6 X |
| 2,376,132 | 5/1945 | Evans | 96—6 |
| 2,382,690 | 8/1945 | Yule | 96—6 |
| 2,628,901 | 2/1953 | Duerr | 96—84 X |
| 2,647,833 | 8/1953 | Harrison et al. | 96—7 |

FOREIGN PATENTS

| | | |
|---|---|---|
| 563,174 | 12/1957 | Belgium. |
| 566,156 | 4/1958 | Belgium. |
| 501,190 | 2/1939 | Great Britain. |
| 811,311 | 4/1959 | Great Britain. |

OTHER REFERENCES

Evans et al.: Principles of Color Photography, Wiley 1953, pages 565, 567, 568, 573.

NORMAN G. TORCHIN, *Primary Examiner.*

MILTON STERMAN, PHILIP E. MANGAN,
*Examiners.*